US005353287A

United States Patent [19]
Kuddes et al.

[11] Patent Number: 5,353,287
[45] Date of Patent: Oct. 4, 1994

[54] LOCAL AREA NETWORK WITH MESSAGE PRIORITY

[75] Inventors: David W. Kuddes, Richardson; Anthony J. Mazzola, Plano; Cecil Mathews, Dallas, all of Tex.

[73] Assignee: Alcatel Network Systems, Inc., Richardson, Tex.

[21] Appl. No.: 857,353

[22] Filed: Mar. 25, 1992

[51] Int. Cl.$^5$ .......................... H04J 3/16; H04Q 9/00
[52] U.S. Cl. .................... 370/85.2; 370/85.3; 370/85.6; 340/825.5
[58] Field of Search .................... 370/60, 85.1, 85.2, 370/85.3, 85.6, 85.13, 85.14, 94.1, 94.3; 340/825.5, 825.51; 371/32, 33

[56] References Cited

U.S. PATENT DOCUMENTS

| | | | |
|---|---|---|---|
| 4,506,361 | 3/1985 | Kume | 370/85.2 |
| 4,561,092 | 12/1985 | Shaver | 370/85.6 |
| 4,623,886 | 11/1986 | Livingston | 370/85.6 |
| 4,663,757 | 5/1987 | Huang et al. | 370/85.6 |
| 4,706,246 | 11/1987 | Kume | 370/85.3 |
| 4,803,681 | 2/1989 | Takahashi | 370/85.6 |

Primary Examiner—Douglas W. Olms
Assistant Examiner—Alpus H. Hsu
Attorney, Agent, or Firm—Bruce C. Lutz; Dennis O. Kraft

[57] ABSTRACT

A message priority scheme for use in local areas networks (LANS) operating in accordance with carrier sense, multiple access/collision detect (CSMA/CD) bus access protocol. A LAN station having a high priority message to send ignores the carrier sense signal, and thereby obtains immediate bus access. If the high priority message collides with another message already on the bus, both messages are subject to a backoff period. However, the backoff period for a high priority message is guaranteed to be less than that of a low priority message for a certain number of re-transmission attempts. An intermediate priority status is assigned to a message that previously had a high priority status, after a certain number of transmission attempts. The intermediate priority message is deprived of its ability to transmit while ignoring the carrier sense signal, but retains its shorter backoff period.

6 Claims, 3 Drawing Sheets

LOCAL AREA NETWORK WITH MESSAGE PRIORITY

TECHNICAL FIELD OF THE INVENTION

This invention relates to data communications, and more particularly to local area networks that use a CSMA/CD bus access scheme. Even more specifically, the invention relates to configuring and operating network processors, in a manner compatible with existing protocols, so that high priority messages have immediate bus access, and, if a collision occurs, are guaranteed transmission within a maximum waiting period.

BACKGROUND OF THE INVENTION

Local area networks (LAN's), are networks of processor-based stations, or nodes, for digitally communicating data. LAN's have several different network topologies. A commonly used topology is the bus, in which all stations are connected to the same cable, i.e., the bus, which is used for transmitting data between any set of two or more stations.

With a bus topology, during a data transmission, there is only a single logical transmission path linking the source and destination stations. Some sort of discipline is needed to ensure that the transmission medium is accessed and used in a fair way.

A widely used bus access scheme is the CSMA/CD (carrier-sense multiple-access, collision detect) scheme. Because the bus is used for transmitting data between any pair of stations, the bus is said to operate in a multiple access mode. All data are transmitted by the sending station first formatting the data in a frame with the address of the destination station in the frame header. The frame is then transmitted on the bus. All stations connected to the bus detect whenever a frame is being transmitted, and when the destination station detects that the frame being transmitted has its own address in the frame header, it continues reading the data in the frame and responds according to a defined link protocol. The header also contains the address of the sending station so that the destination station can respond.

With this system of operation, it is possible for two stations to attempt to transmit a frame over the cable at the same time. If this were permitted to happen, the data would be corrupted. To reduce this possibility, before transmitting a frame, a station listens to the bus to detect if a frame is being transmitted. If it is, i.e., a carrier signal is sensed, the station defers its transmission until the other frame has been transmitted.

Even with carrier sense detection, two stations wishing to transmit a frame may simultaneously determine that there is no current transmission, in which case both attempt to transmit their frames. Also, because of transmission delays, a first station's transmission may not be sensed by a second station. In either case, a "collision" is said to have occurred.

To accommodate the possibility of collisions, as a station transmits its frame onto the bus, it simultaneously monitors the data signal on the bus. If the transmitted and monitored signals are different, a collision is assumed to have been detected. When a station detects a collision, to ensure that the other station is aware of the collision, it sends a random bit pattern for a short period of time known as the jam period. Each station involved then waits for a backoff period before attempting to retransmit its frame. The backoff period is calculated by means of a random function that is statistically expected to generate a different backoff period for each station.

The above-described CSMA/CD bus access scheme is embodied in the IEEE 802.3 standard, where IEEE 802 is the Institute of Electrical and Electronic Engineer's committee 802 on local networking. More specifically, the IEEE 802.3 standard defines the MAC (media access control) sublayer and a corresponding physical layer of the ISO (International Standards Organization) reference model, for connection to a baseband coaxial cable. A well-known example of a CSMA/CD LAN is the Ethernet network, which was developed by Xerox Corporation. The IEEE 802.3 standard is the same as the ISO 8802-3 standard.

Priority under the standard CSMA/CD scheme is "first come, first served" because of the deferment by a transmitter station that detects a carrier sense signal. At least one extension of the CSMA/CD scheme has been developed to permit high priority messages to be more quickly transmitted. One such extension is a linear priority method, which is used after a collision occurs to adjust the backoff time period that a message will wait before a re-transmission is attempted.

A problem with existing priority methods is that high priority messages must wait until a prior message has finished transmitting before obtaining bus access. Also, high priority messages are still susceptible to collisions. Also, if a collision occurs, the bus access time for a high priority message is a function of statistical algorithms and cannot be easily predicted.

It is thus an object of the invention to provide fast bus access times for high priority messages by permitting them to ignore the carrier sense signal. If the high priority message collides with another message already on the bus, sense signal backoff periods are calculated so that for a certain number of re-transmissions, the high priority message has a shorter backoff period than that of a low priority message. Also, an intermediate level of priority is imposed after a high priority message undergoes a predetermined number of collisions. In that case, the message is re-transmitted subject to the carrier sense signal, but with the shorter high priority backoff period. As a result of the invention, bus access time for high priority messages is a deterministic value, which permits response times to high priority events be more easily predicted. Also, in any given LAN network, a station that has a message priority scheme in accordance with the invention is compatible with a station not having such priority. In other words, message priority is established on a per message basis at the transmitting station, and does not interfere with the manner in which the receiving station obtains the message.

BRIEF DESCRIPTION OF THE DRAWINGS

Other objects and advantages of the present invention will be apparent from a reading of the specification and appended claims in conjunction with the drawings, wherein:

DETAILED DESCRIPTION OF THE INVENTION

Overview of the Invention

Figure 1:
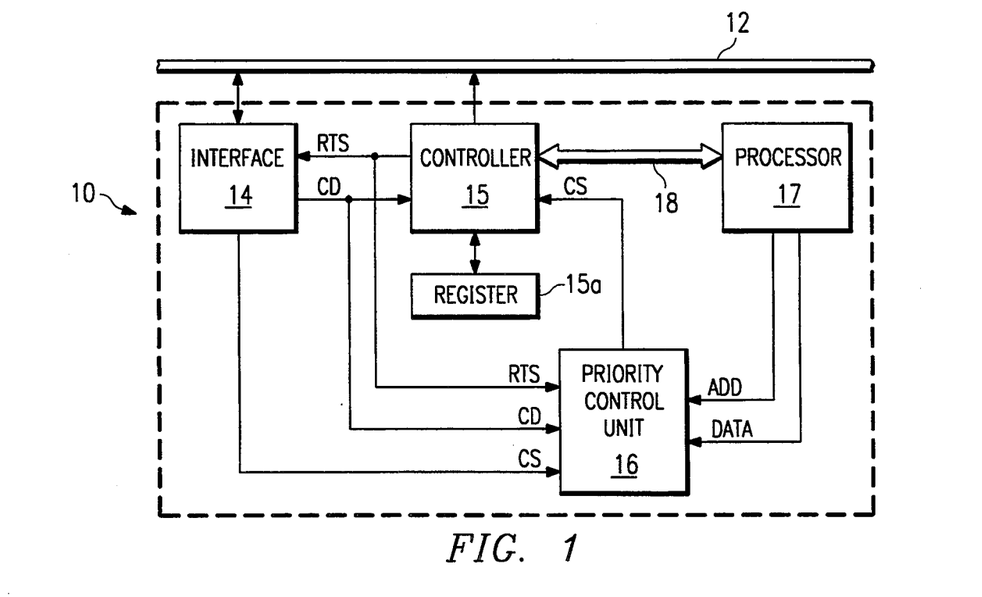
FIG. 1 is a block diagram of a LAN control unit for a single LAN station, which includes a priority unit for implementing a message priority scheme in accordance with the invention.

FIG. 1 illustrates a control unit 10 for a one station of a local area network (LAN). Control unit 10 is connected to a bus 12, for data communications with other LAN stations. Communications between control unit 10 and other control units via bus 12 are in accordance with the CSMA/CD (carrier sense multiple access, with collision detection) bus access scheme described above in the Background section. Today, this scheme is synonymous with the IEEE 802.3/ISO 8802-3 standard, whose documentation is incorporated herein by reference. However, the invention could be useful with any other CSMA/CD bus access scheme using similar carrier sense, collision detect, and backoff period processes.

In addition to control unit 10, a LAN station might have various peripheral devices, such as terminals, printers, mass memory units, and other user input or output devices. Interface devices between control unit 10 and bus 12, such as tap units and transceivers, are not shown in FIG. 1, but are well known in the art of LAN design.

In the example of this description, the LAN station associated with control unit 10, as well as other LAN stations with which it communicates, operate in a single-channel baseband mode. As is typical of such LAN's, the data are Manchester encoded and information is transmitted via a 50 ohm coaxial cable, i.e., bus 12, at rates of 1, 5, or 10 mbps (millibits per second). However, the invention could also be used with other LAN modes, such as a multichannel broadband mode.

Control unit 10 is comprised of an interface unit 14, controller 15, priority unit 16, and processor 17. An underlying concept of the invention is that priority unit 16 can be added to an existing CSMA/CD control unit 10, to provide a message scheme. The hardware aspects of priority unit 16 are described below in connection with FIG. 2. The operational aspects of the invention are described below in connection with FIGS. 3 and 4.

As an overview of the invention, control unit 10 differentiates between high, intermediate, and low priority messages. A control unit 10 with a high priority message to send on bus 12, ignores any incoming carrier sense signal and sends the message regardless of whether a prior transmission from another control unit 10 is on bus 12. Thus, the high priority message receives immediate bus access; it need not wait for a prior message to finish transmission.

If, in fact, another transmission was in progress, a collision occurs. This causes each control unit 10 to get off bus 12. After a certain amount of time, which includes a backoff period, each control unit 10 attempts a re-transmission. The duration of the backoff period is greater for low priority messages, so that the high priority message gains faster access to bus 12. If the collision involves two high priority messages, each attempts a predetermined number of re-transmissions while ignoring the carrier sense signal. Thus, a high priority message has an upper limit on the number of times it is allowed immediate bus access. After the permitted number of attempts, it becomes an intermediate priority message and is re-transmitted subject to the carrier sense signal but with a shorter backoff period.

As a result of the invention, the bus access for high priority messages is deterministic rather than statistically bounded. In the most likely case, the high priority message will gain immediate bus access. After a collision, the standard CSMA/CD backoff algorithm calculates the backoff period by calculating a random value, n, and multiplying that value times a "slot time". The backoff aspect of the invention, which involves the addition of a margin value to n, ensures that for a certain number of re-transmissions, the backoff period for a high priority message is always less than the backoff period for a low priority message. Also, the aspect of the invention ensures that high priority messages will not unduly collide with each other. The result of the invention is that high priority messages are guaranteed bus access with a predetermined maximum time. Thus, if a LAN application requires a message to be quickly delivered, a known maximum bus access time can be used to meet the requirement.

Referring still to FIG. 1, interface unit 14 is a standard device for detecting collisions and performing timing and encoding functions. For the baseband single-channel mode of the CSMA/CD LAN of FIG. 1, one function of interface unit 14 is the Manchester encoding of outgoing messages. Upon receipt of a message, interface 14 decodes the data back to a binary format for use by processor 17. In some control units 10, the encoding/decoding functions of interface 14 may be performed by a separate Manchester encoding/decoding unit ("mendec").

Controller 15 is a programmable device for offloading LAN control functions from processor 17. Thus, controller 15 minimizes the processing overhead that would result if processor 17 handled these functions. In general, controller 15 permits data to be transmitted and received, formatted into frames for transmission, and checked for errors on receipt. More specifically, controller 15 is programmed to handle CSMA/CD tasks, such as carrier sensing, collision detection, and calculation of backoff periods.

Controller 15 has, or is in communication with, a priority register 15a. In the simplest embodiment, register 15a may be programmed with small integer values. Other embodiments may use different values or even non-integer values. As explained below, in connection with FIG. 4, the value stored in register 15a is a low priority margin value, which affects the backoff period of control unit 10.

An example of a suitable controller 15 is the 82596SX LAN coprocessor, manufactured by Intel Corp., which includes priority register 15a for access to the backoff algorithm. However, other controllers having other means for adding the margin value may be used. In practice, controller 15 is usually selected for operation with a certain processor 17. Also, controller 15 may be a "coprocessor" which differs from a controller in the sense that it is highly integrated and needs little intervention by processor 17 to operate. However, as used herein, "controller" includes either a coprocessor or a controller.

Priority unit 16 is a means for implementing the message priority scheme of the invention. Its structure and operation are described in detail in connection with FIGS. 2–4. Priority unit 16 is software controlled by means of signals from processor 17, delivered via ADD (address) and DATA lines.

Priority unit 16 receives several CSMA/CD signal lines, in particular, a CS (carrier sense), CD (collision detect), and RTS (request to send) line. FIG. 1 is not intended to show all control, data, and address lines, whose use are well known in CSMA/CD LAN's; only those relevant to the invention are shown. The CS signal, which indicates whether another station is currently transmitting on bus 12, is diverted from interface 14 to priority unit 16 before being delivered to controller 15. The CD signal indicates whether two LAN stations are attempting to transmit at the same time. The RTS signal is a standard handshaking signal from a transmitting controller 15 to indicate that a message is ready to be sent. The CD and RTS lines are carried to priority unit 16, as well as along their normal CSMA/CD path between interface 14 and controller 15.

Processor 17 implements higher level communication protocols, often referred to as client layer, or application, protocols. Many such applications are well known in the field of LAN networks. An example of a suitable processor 17 is the 68340 microprocessor, manufactured by Motorola Semiconductor Products, Inc.

Communications between controller 15 and processor 17 are via an internal bus 18, typically through a block of shared memory (not shown). Commands and status data are transferred through this memory. Controller 15 transmits data in response to a transmit command from processor 17. The command specifies where in memory the data resides and its destination address. Controller 15 then retrieves this data, frames it, and handles its transmission using CSMA/CD protocols. The receiving portion of controller 15 monitors a serial line for frames of information containing its address. Once such a message is detected, controller 15 stores it in memory, checks it for errors, and notifies processor 17 that data is ready.

For purposes of this description, one function of processor 17 is the generation of high priority messages. An example of such a message is an alarm message, such as might be used for a transmission line failure where LAN stations are part of a switched packet network. The alarm message is considered high priority because it must be immediately delivered to an appropriate network switching station so that an alternate transmission path can be established. In a typical LAN, a processor 17 at any station might have a high priority message to send, whether in response to some sort of internally generated condition or in response to data acquired in response to some external condition.

PRIORITY UNIT DETAILS

Figure 2:
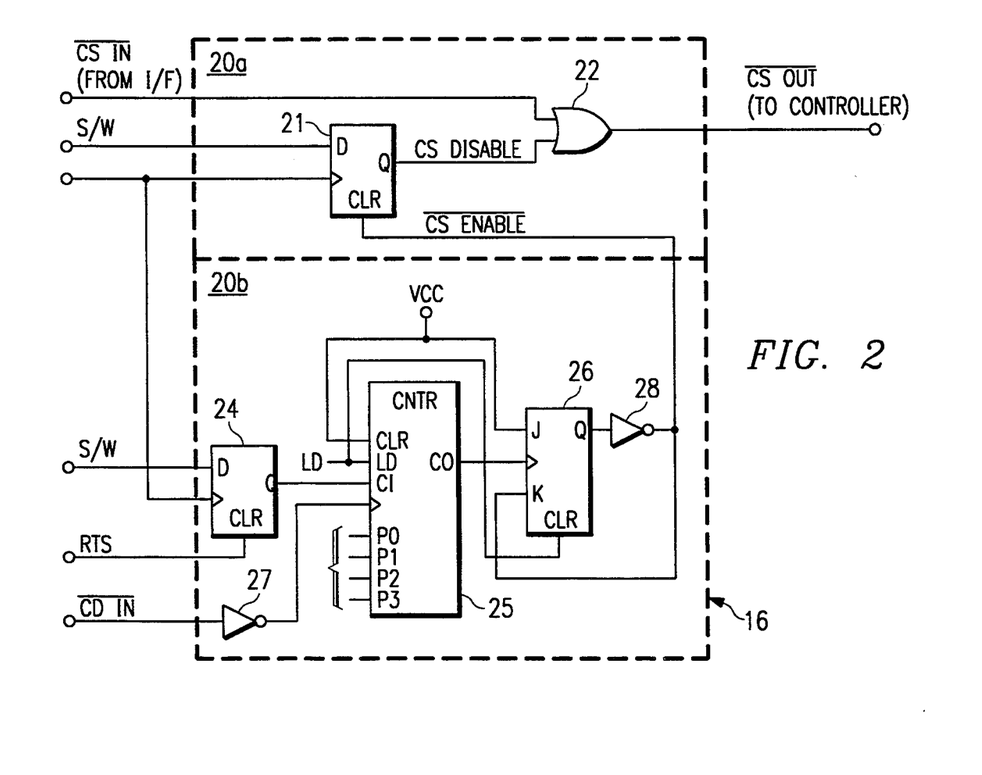
FIG. 2 is a block diagram of the priority unit of FIG. 1.

FIG. 2 is a block diagram of priority unit 16, which is comprised of two main units: CS-ignore logic 20a and counter logic 20b. In general, the CS-ignore logic 20a provides a means for disabling a CS signal so that a station with a high priority message to send can enter a CS-ignore mode. Counter logic 20b provides a means for automatically resetting the CS-ignore mode after transmission or after a predetermined number of attempted transmissions. The signal lines in FIG. 2 carry various signals and signal complements, with a signal complement being indicated herein by the notation ()'.

CS-ignore logic 20a is comprised of D flip-flop 21 and an OR gate 22. Flip-flop 21 is controlled by processor 17, such that when the software input (S/W) at the D input is set, the CS signal is disabled and controller 15 does not detect it. The CLK (clock) input is from processor 17 for loading the D input. The (CS ENABLE)' signal at the CLR (clear) input resets flip-flop 21 so that the CS signal is no longer disabled.

The inputs to OR gate 22 are a CS DISABLE signal from the Q output of flip-flop 21 and a (CS IN)' signal from interface 14. As a result of the CS-ignore logic 20a, if the CS DISABLE signal is on, the (CS OUT)' signal has a 0 value. Otherwise, the CS signal is delivered to controller 15.

Counter logic 20b is comprised of D flip-flop 24, counter 25, JK flip-flop 26, and inverters 27 and 28. Power is supplied at the CLR (clear) input of counter 25 and at the J input of flip-flop 26.

Counter 25 counts the number of times, if any, that a high priority message is transmitted while the CS signal is being ignored. The CLK (clock) input accomplishes this counting by counting the (CD IN)' signal, inverted by inverter 27. As explained below in connection with FIG. 3, in operation, when two or more high priority messages collide, counter 25 permits a limit to be set on re-transmissions. This limit is referred to herein as the "CS-ignore limit".

In the preferred embodiment, counter 25 is a hexadecimal/up counter, which counts any value from 0–15. The data inputs (PO-P3) are used to load a value to be subtracted from 15 for the desired count value. This loading is accomplished with processor 17. When counter 25 overflows, its CO (carry out) output triggers flip-flop 26 and causes the (CS ENABLE)' signal, and hence the CS DISABLE signal, to be low, which permits the CS IN signal to pass through OR gate 22 to controller 15 as if in standard CSMA/CD operation. The LD (load) input enables counter loading. The LD input is also applied to the CLR (clear) input of flip-flop 26 so that it stops asserting its output during counter loading.

Another input to counter 25 is a CI (count inhibit) signal, which is the Q output of D flip-flop 24. The D input of flip-flop 24 is a software (S/W) signal, controlled by processor 17. The CLK (clock) input is from processor 17 for loading the D input. The CLR (clear) input of flip-flop 24 is the RTS signal from controller 15. When the D input is set, the CD signal is not counted. The RTS signal is used to reset flip-flop 24 so that counter 25 will begin counting.

Flip-flop 26 is a clocked JK flip flop, whose clock input is the carry out (CO) signal. The K input is a feed-back signal from the output. Inverter 28 inverts the Q output of flip-flop 26, resulting in the output signal (CS ENABLE)'.

As stated above, the (CS ENABLE)' output of counter logic 20b is delivered to flip-flop 21 and used to reset the CS DISABLE signal as collisions are being detected. One means for implementing priority unit 10 is by programming a gate array, commonly known as a field programmable gate array. Other types of commercially available programmable logic devices could be used. Of course, discrete logic devices may also be used.

OPERATIONAL ASPECTS OF THE INVENTION

Figure 3:
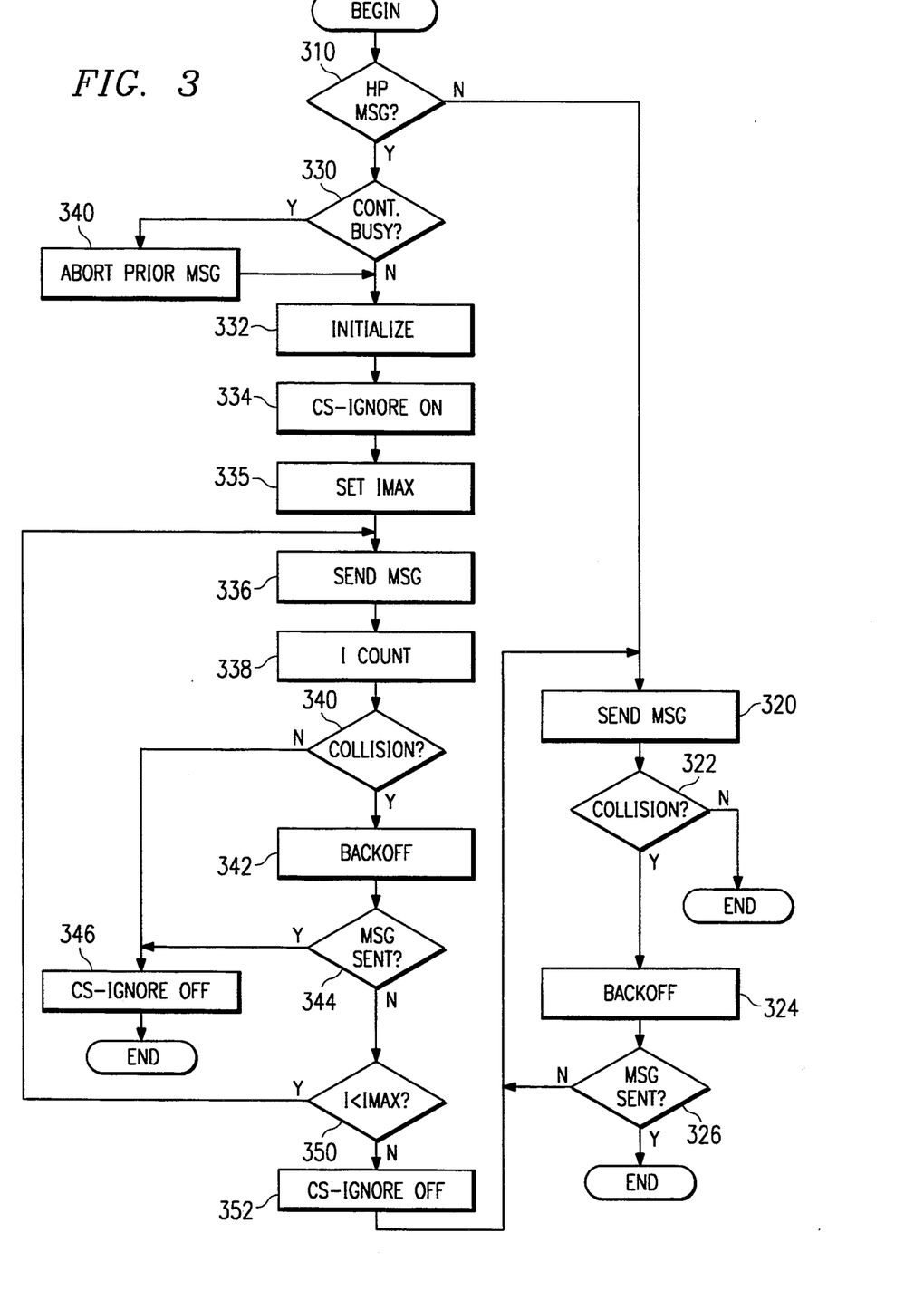
FIG. 3 illustrates the process of transmitting messages according to a high, intermediate, or low priority status.

FIG. 3 illustrates a method for imposing message priority in accordance with the invention. The method shown in FIG. 3 is from the point of view of a station with a message to send. If a collision occurs, all stations involved enter a backoff process described below in connection with FIG. 4.

Step 310 is determining whether a message is a high or low priority message. Typically, application level programming of processor 17 assigns priority status, which is indicated by means of various codes. Using the priority unit 16 of FIG. 2, a high priority message is used to set flip-flop 21 so that the CS signal is disabled.

Steps 320–326 are performed if the message is not a high priority message. In step 320, the transmission is attempted according to the usual CSMA/CD protocols. For example, the control unit 10 with a low priority message does not attempt a transmission if the CS signal is active. If a transmission is begun by a first control unit 10, but transmission delay has prevented it from detecting an earlier transmission from a second control unit 10, a CD signal goes active for both control units 10, which then both enter a collision mode. If a collision occurs, as determined in step 322, step 324 is entering a backoff mode, which is described below in connection with FIG. 4. Re-transmission is attempted until the message is sent or aborted. As explained below, intermediate priority messages are high priority messages that have lost their CS-ignore advantage but continue to be re-transmitted in accordance with steps 320–326.

If the message is high priority, steps 330 and 340 involve determining if the controller 15 that will handle transmission of the message is busy with another transmission having a lower priority. If it is, that transmission is aborted so that the high priority message may be delivered first.

Step 332 is initializing the means for counting the number of re-transmissions that will be permitted while the CS signal is being ignored by controller 15. If priority unit 16 of FIG. 2 is used to implement this step, counter 25 is loaded at its LD input, which clears flip-flop 26 and sets the (CS ENABLE)' signal high, which in turn clears flip-flop 21 and sets the CS DISABLE signal high. Flip-flop 24 is set so that counting is inhibited.

Step 334 is entering a CS-ignore mode, in which the CS signal to controller 15 is disabled, ignored, or otherwise made ineffective. This provides the high priority message with immediate bus access, regardless of whether a message from another network station is currently being transmitted. Using the priority unit of FIG. 2, flip-flop 21 is set so that the output of OR gate 22 causes controller 15 to not detect a CS signal.

Step 335 is providing a value, $I_{max}$, representing the maximum number of times the message may be transmitted while the CS signal is disabled. Using the priority unit 16 of FIG. 2, this step is implemented by loading counter 25.

Step 336 is sending the high priority message. This transmission is "blind" in the sense that, because the CS signal is disabled, control unit 10 does not know if another station is transmitting. If a message is already being transmitted from another station, the result is a forced collision. In accordance with CSMA/CD protocols, in response to a CD signal, all control units 10 go off bus 12 and enter a backoff mode. As explained below in connection with FIG. 4, the backoff periods for high and low priority messages are calculated in a manner that permits the high priority message to regain bus 12 first.

Step 338 is counting the number of times the high priority message is transmitted while the CS signal is being ignored. Re-transmissions are permitted until the predetermined CS-ignore limit, $I_{max}$, is reached. The counting is not begun until there is positive confirmation from controller 15 that step 336 has occurred and transmission has begun. This prevents the counting of collisions resulting from messages from other stations.

Using the priority unit of FIG. 2, step 338 may be implemented with counter 25, whose CI (count-inhibit) input is released in response to a RTS signal via flip-flop 24. The (CDIN)' signal from interface 14 is inverted and applied to the CLK (clock) input of counter 25, which increments counter 25 at every collision. Step 340 and 342 are determining whether a collision has occurred, and, if so, entering a backoff mode. The backoff process is described below in connection with FIG. 4.

Once the message is successfully transmitted, or aborted before a limit on the permissible number of re-transmission attempts is exceeded, as determined by step 344, step 346 is exiting the CS-ignore mode. The next message is re-evaluated and handled according to whether it is high or low priority.

If after the first re-transmission attempt, the message is still not delivered, step 350, determining if $I_{max}$ has been reached, is performed. If so, step 352, enabling the CS signal, is performed. Thus, after its CS-ignore limit is reached, a high priority message no longer ignores the CS signal, and is thus a "CS-sensitive" message. Another high priority message with a greater number of permitted re-transmissions would prevail on bus 12. However, the CS-sensitive high priority message would still have faster bus access than low priority messages because of its shorter backoff period. Using priority unit 16, when counter 25 overflows, the output of flip-flop 26 goes low, which makes the input to flip-flop 21 low and permits the CS signal to pass through the CS-ignore logic 20a to controller 15.

Steps 335, 338, 350 and 352 accommodate the possibility that two high priority messages might collide, and in effect, provide an intermediate level of priority. Different types of high priority messages may be assigned varying values of $I_{max}$, so that one high priority message might be permitted a greater number of transmission attempts than another.

Figure 4:
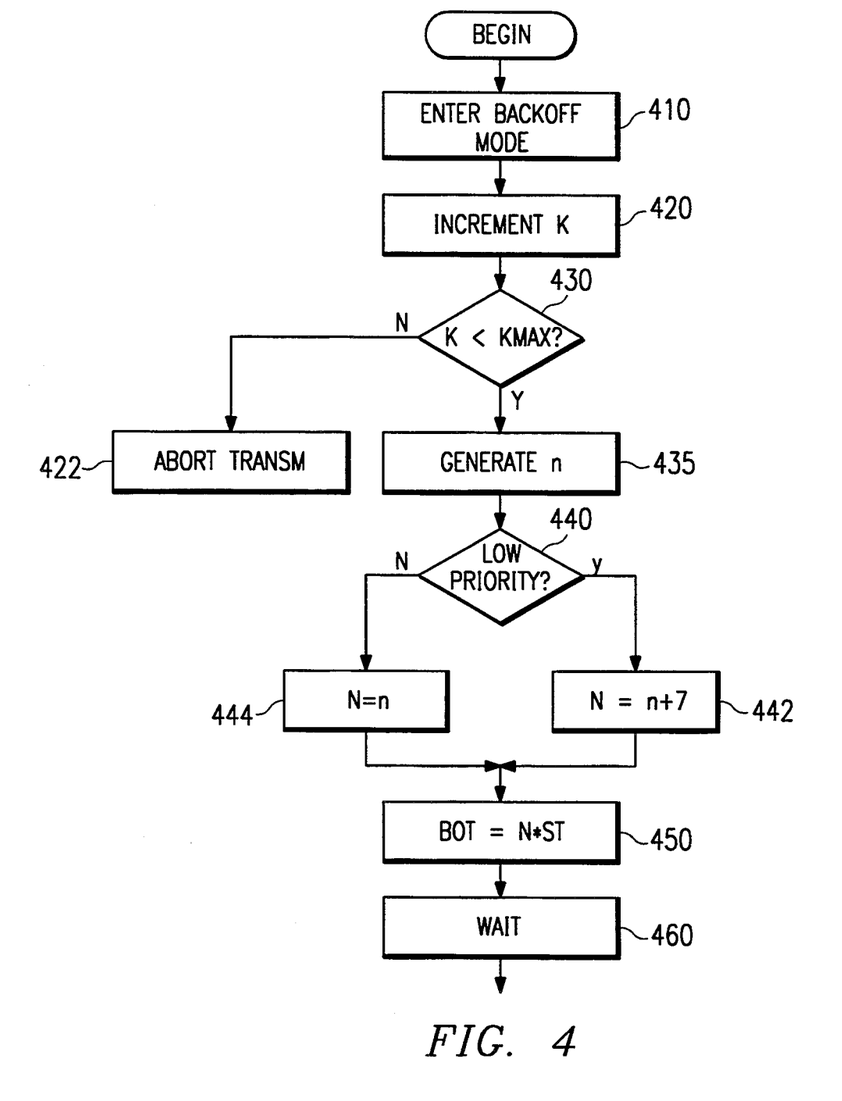
FIG. 4 illustrates the backoff process of FIG. 3.

FIG. 4 illustrates the backoff process, which differentiates between high and low priority messages when a collision occurs. Each station involved in the collision performs the process of FIG. 4 by means of its controller 15, which calculates the backoff period differently, depending on whether it is high or low priority.

As an overview of the process of FIG. 4, it calculates the backoff period for waiting before re-transmission is attempted after a collision. This backoff period is the product of a value, N, which represents the number of "slot times" the transmitting station must wait, times the value of the slot time. In general, the slot time is a worst-case time delay that a station must wait before it can reliably know a collision has occurred. Slot time calculation is well known in the field of CSMA/CD bus access.

Step 410 is entering the backoff mode, and step 420 is incrementing a value, k, which represents the number of attempted re-transmissions after a collision. After the first collision, k=0, after the second, k=1, etc.

Step 430 is determining if the current value of k is greater than a predetermined value, $k_{max}$, which represents the maximum number of times that re-transmission attempts are permitted. Once $k_{max}$ is reached, the transmission is aborted, as indicated by step 422.

Step 435 is generating a value for n, which is referred to herein as the "standard backoff multiple" from which N, the "priority backoff multiple", is derived. A random function generates n, whose boundaries are set by the equation, $$0 <= n < 2^{min(k, 10)}$$

where exponent of 2 is the minimum of k and the value 10. The upper limit of n is bounded by $2^{10}$ so that the backoff period is not unduly long, but some other number than 10 could be used. Random functions for generating n are known in the field of CSMA/CD bus access schemes.

Step 440 is determining whether the message is high or low priority. If low priority, step 442 is adding a low priority margin to n. In the preferred embodiment, the low priority margin is added to n by means of a register, such as register 15a, associated with controller 15. The low priority margin is loaded to register 15a via processor 17. However, other means for adding a value to n could be used, such as by modification of the backoff algorithm executed by controller 15 by including a low priority margin constant.

In the preferred embodiment, the low priority margin is the integer value, 7. Thus, for low priority messages, $N_{low} = n+7$. If the message is not a low priority message, $N_{high} = n$, as indicated by step 444.

Step 450 is calculating the backoff time (BOT), which as stated above, is the product of N times the slot time (ST). In step 460, the message waits for this time, before a re-transmission is attempted.

The result of the computation of N is that on the first and second re-transmissions, $N_{high}$ will always be a smaller number than $N_{low}$, and thus the bus access time for high priority messages will always be less. On the first re-transmission, the backoff period for a high priority message is 0 or 1 times the slot time, and the backoff period for a low priority message is 7 or 8 times the slot time.

Instead of being 7, the low priority margin could have other values, such that the differential between $N_{high}$ and $N_{low}$ is guaranteed for some other number of transmissions. For example, if the low priority margin is 15, the differential would be guaranteed until the fourth re-transmission. Also, the low priority margin need not be an integer value.

From the foregoing description, it should be understood that a method is provided for at least three levels of priority. High priority messages are not subject to the CS signal as are low priority messages. If a high priority message collides with another message, it has a shortened backoff period for a certain number of re-transmissions. After a certain number of re-transmission attempts, a high priority message becomes an intermediate priority message, subject to the CS signal but still having a shortened backoff period.

OTHER EMBODIMENTS

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

We wish to be limited, not by the embodiments illustrated and described, but only by the scope of the appended claims, wherein we claim:

1. A method for adding a message priority scheme to a local area network station control unit operating in accordance with carrier sense, multiple access with collision detect (CSMA/CD) bus access protocol, comprising the steps of:
   generating a carrier sense signal in response to a carrier to inhibit transmission of a message;
   disabling said carrier sense signal when said message is a high priority message;
   transmitting said high priority message while said carrier sense signal is disabled;
   generating a collision detect signal in response to a collision between said high priority message and another message;
   inhibiting a re-transmission of said high priority message for a high priority backoff period in response to said collision detect signal;
   re-transmitting said high priority message, in response to said collision detect signal, after said high priority backoff period has elapsed;
   updating a count value in response to said collision detect signal;
   repeating the collision detect signal generating, inhibiting, re-transmitting and updating steps until either no collision occurs or said count value equals a predetermined number;
   re-enabling said carrier sense signal;
   prohibiting transmission of messages while said carrier sense signal is generated; and
   re-transmitting said high priority message when said count value equals said predetermined number, when said high priority backoff period has elapsed, and generation of said carrier sense signal has ceased.

2. A control unit for adding a two-level message priority scheme to a local area network bus operating in accordance with carrier sense, multiple access with collision detect (CSMA/CD) bus access protocol, comprising:
   an interface for detecting a collision of messages on the local area network bus and generating a collision detect signal in response to said collision, and for detecting a carrier on the bus and generating a carrier sense signal in response to said carrier;
   a controller for executing CSMA/CD tasks, wherein said controller receives said collision detect signal from said interface and delivers a request to send a signal to said interface when a message is ready for transmission or re-transmission on said bus;
   means for selecting between a standard backoff multiple and a low priority backoff multiple of longer duration than said standard backoff multiple, said means for selecting being in communication with said controller;
   said controller further operable to calculate a backoff period said controller waits before delivering a second request to said interface to re-transmit said message, said controller uses said standard backoff multiple to calculate said backoff period if said message is a high priority message and said controller uses said low priority backoff multiple if said message is a low priority message; and
   a priority unit for receiving said carrier sense signal from said interface and for delivering said carrier sense signal to said controller, wherein said priority unit further comprises means for disabling said carrier sense signal to said controller to allow said high priority message to be transmitted, said high priority message is re-transmitted on said bus if a collision with another message on said bus is not detected by said interface, wherein said priority unit further comprises means for counting the number of times said high priority message is re-transmitted while said carrier sense signal is being disabled, and means for re-enabling said carrier sense signal to said controller in response to said counting means counting to a predetermined number.

3. A method for adding a message priority scheme to multiple local area network station control units operating in accordance with carrier sense, multiple access with collision detect (CSMA/CD) bus access protocol, comprising the steps of:

generating a carrier sense signal in response to a carrier;

determining whether a message to be transmitted on said bus is a high priority message or a low priority message;

if said message is a high priority message,
  disabling said carrier sense signal;
  transmitting said high priority message; and
  determining whether said high priority message collides with another message;
  if a collision occurs, then performing the steps of:
    inhibiting a re-transmission of said high priority message;
    waiting for a high priority backoff period to elapse;
    re-transmitting said high priority message;
    determining if said re-transmitted high priority message collides with another message;
    adjusting a count value in response to said collision;
    repeating the steps of inhibiting, waiting, re-transmitting, determining, and adjusting until either said count value equals a predetermined number or no collision of said re-transmitted high priority message occurs;
    re-enabling said carrier sense signal;
    if said count value equals said predetermined number, then re-transmitting said high priority message, after said high priority backoff period elapses, as an intermediate priority message subject to said carrier sense signal;

if said message is a low priority message,
  transmitting said low priority message subject to said carrier sense signal;
  determining if said low priority message has collided with another message;
  if a collision occurs,
    waiting for a low priority backoff period to elapse; and
    re-transmitting said low priority message subject to said carrier sense signal.

4. A control unit for adding a message priority scheme to a local area network bus operating in accordance with carrier sense, multiple access with collision detect (CSMA/CD) bus access protocol, comprising:

a processor for generating messages incorporating higher level message protocols;

an interface for detecting a collision of messages on the local area network bus and generating a collision detect signal in response to said collision, and for detecting a carrier on the bus and generating a carrier sense signal in response to said carrier;

a controller for executing CSMA/CD tasks, wherein said controller has means for receiving said collision detect signal from said interface, means for delivering a request to send a signal to said interface when a message generated by said processor is ready for transmission, and means for calculating different backoff periods for high and low priority messages; and a priority unit, controlled by said processor via address and data lines, for receiving said carrier sense signal from said interface and for delivering said carrier sense signal to said controller, wherein said priority unit further comprising a logic gate unit for disabling said carrier sense signal from said controller when a high priority message is to be transmitted, wherein said priority unit further comprises means for initiating re-transmission of said high.priority message if said high priority message has a collision with another message on the local area network bus and a counter unit for re-enabling said carrier sense signal after a certain number of re-transmission attempts for said high priority message, such that said high priority message is transmitted subject to said carrier sense signal but with a high priority backoff period.

5. A method for adding a message priority scheme to multiple local area network station control units operating in accordance with carrier sense, multiple access with collision detect (CSMA/CD) bus access protocol, comprising the steps of:

sensing a carrier on a bus;

detecting a collision between multiple messages on said bus;

generating from a network interface a carrier sense signal in response to said carrier and a collision detect signal in response to said collision;

generating a request to send a signal with a network controller when a message is to be transmitted on said bus;

coupling said carrier sense signal from said network interface to said network controller via a priority control unit;

coupling said collision detect signal from said network interface to said network controller and to said priority control unit;

coupling said request to send signal from said network controller to said network interface and to said priority control unit;

transmitting high priority messages and low priority messages from said network controller;

disabling said carrier sense signal between said priority control unit and said network controller during transmission of high priority messages;

inhibiting a re-transmission of said high priority messages in response to said collision detect signal;

calculating, in response to said collision detect signal, a backoff period which is longer for a low priority message than for a high priority message;

if said message is a low priority message, re-transmitting, after said backoff period has elapsed, said low priority message when said carrier sense signal ceases to be generated;

if said message is high priority message, re-transmitting, after said backoff period has elapsed, said high priority message;

counting, in response to said collision detect signal and said request to send signal, the number of times that transmission of said high priority message is attempted while said carrier sense signal is disabled;

repeating the step of re-transmitting said high priority message, in response to said collision detect signal and said request to send signal, until either the number of times equals a predetermined number or no collision is detected;

re-enabling said carrier sense signal when the number of times equals said predetermined number; and if transmission of said message without detecting a collision has not occurred, re-transmitting said message subject to said backoff period and said carrier sense signal.

6. A message priority unit for use within a local area network (LAN) control unit coupled to a bus operating in accordance with carrier sense, multiple access with collision detect (CSMA/CD) bus access protocol, comprising:

a logic gate unit operable to receive a carrier sense signal from an interface, said carrier sense signal indicates a signal on the bus to which the interface is coupled, said logic gate unit further operable to couple said carrier sense signal to a controller operable to execute CSMA/CD tasks and control said interface, said logic gate unit further operable to disable said carrier sense signal to said controller when the control unit sends a high priority message; and a counter unit operable to receive a collision detect signal from said interface, said collision detect signal indicative of a collision between said high priority message and another signal on the bus, said counter further operable to count, in response to said collision detect signal, the number of times said high priority message is re-transmitted while said carrier sense signal is being disabled.

* * * * *